(12) United States Patent
Bolde et al.

(10) Patent No.: US 6,942,137 B2
(45) Date of Patent: Sep. 13, 2005

(54) DIE REMOVAL METHOD AND APPARATUS

(75) Inventors: Lannie R. Bolde, New Paltz, NY (US); Jac A. Burke, Lake Katrine, NY (US); Kevin C. Gallagher, Wappingers Falls, NY (US); Howard Hutchinson, Wappingers Falls, NY (US); Juan C. Jeri, Port Ewen, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/605,673

(22) Filed: Oct. 16, 2003

(65) Prior Publication Data

US 2005/0082352 A1   Apr. 21, 2005

(51) Int. Cl.⁷ ............................................. B23K 37/00
(52) U.S. Cl. ........................ 228/44.7; 228/13; 228/19
(58) Field of Search ................... 228/13, 19, 44.7, 228/49.5, 53, 119, 212, 264; 269/97, 104, 269/111

(56) References Cited

U.S. PATENT DOCUMENTS

| | | | |
|---|---|---|---|
| 4,697,729 A * | 10/1987 | Wallgren | 228/20.5 |
| 4,979,287 A | 12/1990 | Schwab et al. | 29/764 |
| 5,054,681 A * | 10/1991 | Kim | 228/191 |
| 5,152,447 A * | 10/1992 | Wallgren et al. | 228/4.1 |
| 5,553,766 A | 9/1996 | Jackson et al. | 238/13 |
| 5,556,024 A * | 9/1996 | Olson et al. | 228/264 |
| 5,636,781 A | 6/1997 | Olson et al. | 228/19 |
| 5,707,000 A * | 1/1998 | Olson et al. | 228/264 |
| 5,738,267 A | 4/1998 | Olson et al. | 228/13 |
| 5,740,954 A * | 4/1998 | Pai et al. | 228/40 |
| 5,779,133 A | 7/1998 | Jackson et al. | 228/13 |
| 5,782,403 A | 7/1998 | Wang | 228/264 |
| 5,836,071 A | 11/1998 | Falcone et al. | 29/593 |
| 6,005,292 A | 12/1999 | Roldan et al. | 257/777 |
| 6,163,014 A | 12/2000 | Bergeron et al. | 219/338 |
| 6,216,937 B1 | 4/2001 | DeLaurentis et al. | 228/13 |
| 6,300,782 B1 | 10/2001 | Hembree et al. | 324/760 |
| 6,301,436 B1 * | 10/2001 | Hsiao | 392/418 |
| 6,313,651 B1 | 11/2001 | Hembree et al. | 324/755 |
| 6,320,163 B2 | 11/2001 | Bergeron et al. | 219/388 |
| 6,333,491 B1 | 12/2001 | Bergeron et al. | 219/388 |
| 6,360,934 B1 * | 3/2002 | Cilia et al. | 228/19 |
| 6,360,938 B2 | 3/2002 | DeLaurentis et al. | 228/191 |
| 6,360,940 B1 | 3/2002 | Bolde et al. | 228/264 |
| 6,474,530 B1 * | 11/2002 | Hodil et al. | 228/42 |
| 6,705,506 B1 * | 3/2004 | Sund | 228/42 |
| 6,745,932 B2 * | 6/2004 | Bezama et al. | 228/191 |
| 6,811,072 B2 | 11/2004 | Bolde | 228/191 |

FOREIGN PATENT DOCUMENTS

DE    4241412    *    6/1994

* cited by examiner

*Primary Examiner*—Jonathan Johnson
(74) *Attorney, Agent, or Firm*—Lisa Jaklitsch; Cantor Colburn LLP

(57) ABSTRACT

A method and apparatus for separating a semiconductor device from a substrate in a fixture with a shearing element, wherein the semiconductor device is attached to the substrate by solder connections to form an assembly, includes using the shearing element to apply a loading force to the semiconductor device. The assembly of the substrate and the semiconductor device are loaded into the fixture with the shearing element proximate the semiconductor device, and heating the solder connections of the assembly in the fixture are heated proximate the substrate to a predetermined temperature by applying a heat source to a surface of the substrate distal from the semiconductor device.

12 Claims, 3 Drawing Sheets

DIE REMOVAL METHOD AND APPARATUS

BACKGROUND OF INVENTION

This invention pertains to a method and an apparatus for removing soldered electronic components from a substrate. More particularly, it relates to non-destructive, low stress removal of chips temporarily soldered to a substrate during Known-Good-Die (KGD) testing and processing of flip chip devices.

As the state of the art advances, devices formed on semiconductor chips become smaller in dimensions and the devices become more densely crowded on the chip. As a result there is an increasingly important need to pretest devices as a quality control measure involving identification and elimination of defective chips before use thereof. To facilitate pretesting, a technology has developed which is commonly referred to as the KGD (Known Good Die) practice in which a chip is bonded to a temporary substrate in a temporary chip attachment (TCA) process wherein, during a testing interval, the chip is mounted temporarily to a chip carrier substrate which has electrical contacts which match contacts on the chip. During the testing interval, the chip is electrically tested through the substrate. After completion of testing, the chip is removed from the substrate for future use. During the testing interval, a burn-in process is used in which the chip to be tested is bonded temporarily to the substrate. It is desirable for the bonds between the substrate and the chip to be mechanically weak, but strong enough to hold the semiconductor chip in place and to maintain good electrical connections during testing. The chip is normally positioned on the substrate so that the electrical contacts, e.g. C4 solder balls (hereinafter referred to as C4's) on the chip are aligned with the corresponding contacts on the substrate so that the C4's make electrical connections between the chip and the substrate.

In one process for the testing of KGD flip chip devices, silicon chips are temporarily attached by solder balls (typically a SnPb alloy, such as 3% tin (Sn) and 97% lead (Pb), referred to as 3/97 solder) to a composite or ceramic substrate (chip carrier) and subjected to electronic component testing and burn-in. Following this testing, the chips are mounted in a first fixture and subjected at ambient temperature to shear forces across the solder balls to remove the chip from the substrate. These forces typically fracture the solder balls, leaving some solder attached to the substrate and the remainder of the solder attached to the chip. Thereafter, the chips are removed from the first fixture, and those, which tested as good, are then mounted in a second fixture for heat processing to liquefy the solder on the chip and reform the solder balls. The resulting chips are then packaged and eventually mounted in an array of chips on another substrate.

A variety of processes and techniques have been devised and described in the art to form a temporary connection between semiconductor chips and substrates, so as to be able to readily separate the chip and the substrate after burn-in tests have been conducted. Several of these are described in U.S. Pat. No. 5,556,024 of Olson et al., commonly assigned for "Apparatus and Method for Removing Known Good Die Using Hot Shear Process" and the teachings thereof are incorporated herein by reference. In the process of the Olson et al. patent, the substrate which is referred to as device carrier and the device are placed in a fixture, heated to the solder liquidus temperature, and the device is then pulled away from the substrate. In one embodiment, after being heated to the solder liquidus temperature, shear forces are applied sufficient to overcome solder surface tension and to separate the die and carrier. Related patents of Olson et al. include U.S. Pat. Nos. 5,707,000; 5,636,781; 5,738,267.

U.S. Pat. No. 6,163,014 to Bergeron et al. for "Apparatus and Method for Non-Destructive, Low Stress Removal of Soldered Electronic Components" describes an apparatus and a method for removing circuit chips from an assembly including one or more circuit chips attached to at least one chip carrier, or substrate. The chips are subjected to static shear with respect to the substrate, and heated to a temperature facilitating shear within a temperature range at which solder connections are solid, such that the chip is sheared off with respect to the substrate at the plane of attachment of the solder to the substrate. In addition, the chips are further heated following disassembly to a temperature at which the solder is liquid to facilitate reforming the solder for subsequent attachment of the chip into an electronic device. In addition the substrate is held within a top plate and the circuit chips are positioned within successive chip cavities within a bottom plate. Each chip cavity includes a load surface separated by a cascade effect pitch with respect to adjacent chip cavities. A cascade effect shear force is sequentially applied to the circuit chips to remove them from the substrate seriatim.

The substrate has reduced pad dimensions, which releases the C4's therefrom, thereby permitting the C4's to remain on the newly tested chips during the removal process so that the chips can be reattached to the final substrate in the product for which they were manufactured. In addition, the removal process is conducted at pre-reflow temperatures, i.e. below reflow temperatures. A linear shearing force is applied to the first substrate carrier by way of a single compression coil spring. This action pushes the substrate forward and forces the chip to press against a shear tab thus pre-loading the C4's on the first chip with a known shear force. The shear force being applied is set to shear the chip when it has been heated to an elevated temperature. Therefore, at room temperature the chip remains connected to the substrate. When the loaded fixture is placed into a furnace and heated to a critical temperature, the C4 joints and the chip are sheared away from the substrate. The heating raises the temperature until it softens the C4 solder balls on all the parts until they allow the shearing force to push the first carrier forward thus shearing the first chip away from the carrier. As this carrier is moved forward by the coil spring, the first substrate makes contact to the second substrate and the remaining coil spring force is applied to the chip on the second carrier. This action continues until all chips on all carriers are sheared seriatim. With the Bergeron et al. process, there is a variation in coil spring force as the coil spring moves the first substrate forward using the Bergeron et al. process, the coil spring force rate changes. Therefore, forces applied to each chip are different. In addition, the first chip in the row is the only chip that receives the maximum shear force at room temperature which results in an inconsistent application of force.

The down side to any of the above processes is yield loss in terms of missing and/or damaged C4's or bottom layer metallurgy (BLM) damage.

SUMMARY OF INVENTION

The foregoing discussed drawbacks and deficiencies of the prior art are overcome or alleviated by a method for separating a semiconductor device from a substrate in a fixture with a shearing element wherein the semiconductor device is attached to the substrate by solder connections to form an assembly. In an exemplary embodiment, the method includes using the shearing element to apply a loading force to the semiconductor device. The assembly of the substrate and the semiconductor device are loaded into the fixture with the shearing element proximate the semiconductor device, and heating the solder connections of the assembly in the fixture are heated proximate the substrate to a predetermined temperature by applying a heat source to a surface of the substrate distal from the semiconductor device.

In another aspect, an apparatus for removing a circuit chip from a substrate wherein the chip is secured to a substrate by solder connections includes a shearing element configured to apply a loading force to the chip, and a fixture having a loading element for placing the substrate with the chip onto the fixture, wherein the solder connections intermediate the chip and the substrate are heated to a predetermined temperature by applying a heat source to a surface of the substrate distal from the chip.

In accordance with still another aspect of the invention, an apparatus for separating a semiconductor device from a substrate, wherein the semiconductor device is attached to the substrate by solder connections to form an assembly, includes a shearing element for applying a loading force to separate the device from the substrate to which into a loading position under a fixture it is urged. A loading element is used for placing the assembly of the substrate and the semiconductor device into the fixture with a window therethrough for the semiconductor device, with the shearing element in thermal contact with the semiconductor device and armed for shearing the semiconductor device from the substrate.

BRIEF DESCRIPTION OF DRAWINGS

The foregoing and other aspects and advantages of this invention are explained and described below with reference to the accompanying drawings, in which.

DETAILED DESCRIPTION

Figure 1:
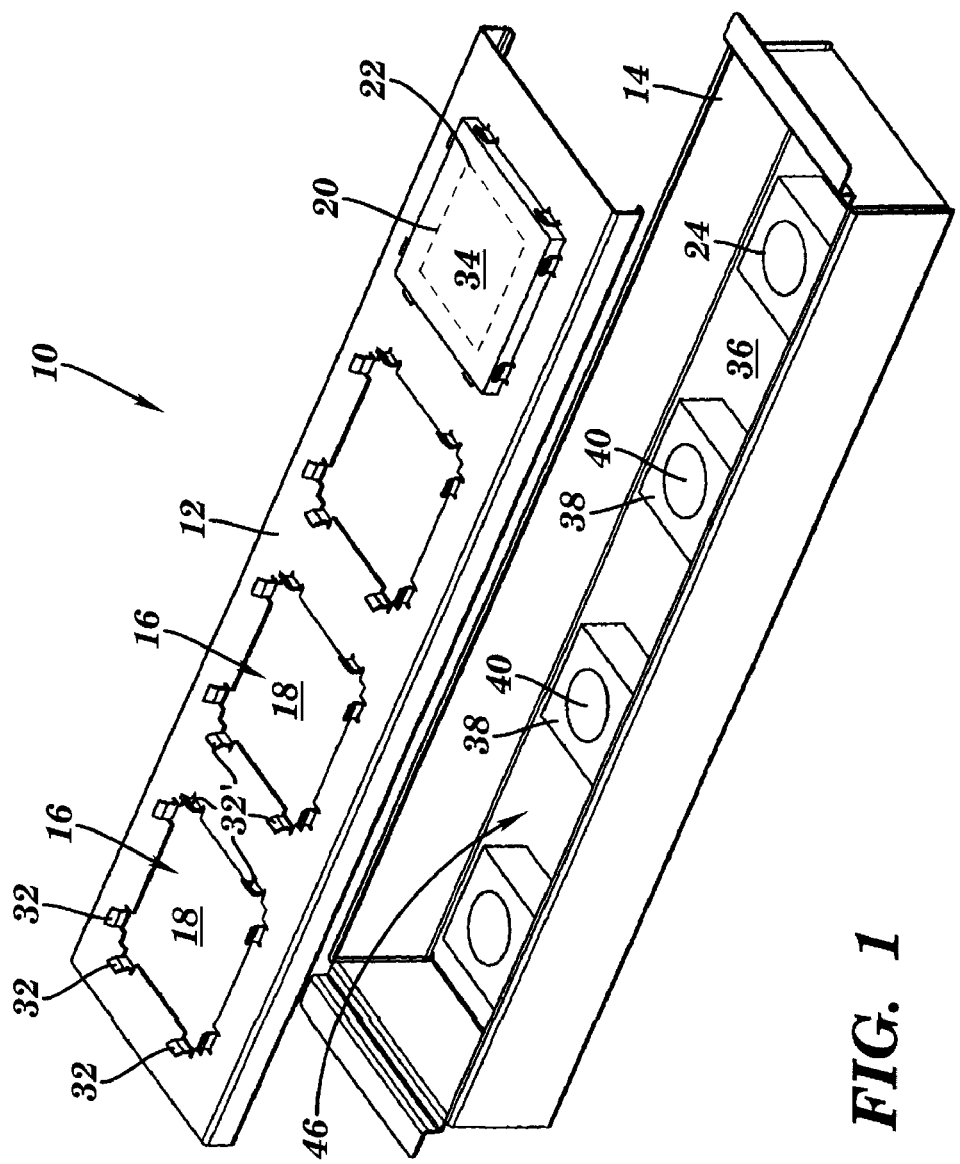
FIG. 1 is a perspective view of a boat assembly including an upper, framing boat and a lower support boat which catches a chip and attached block assembly after performing the shearing operation in accordance with this invention.
Figure 2:
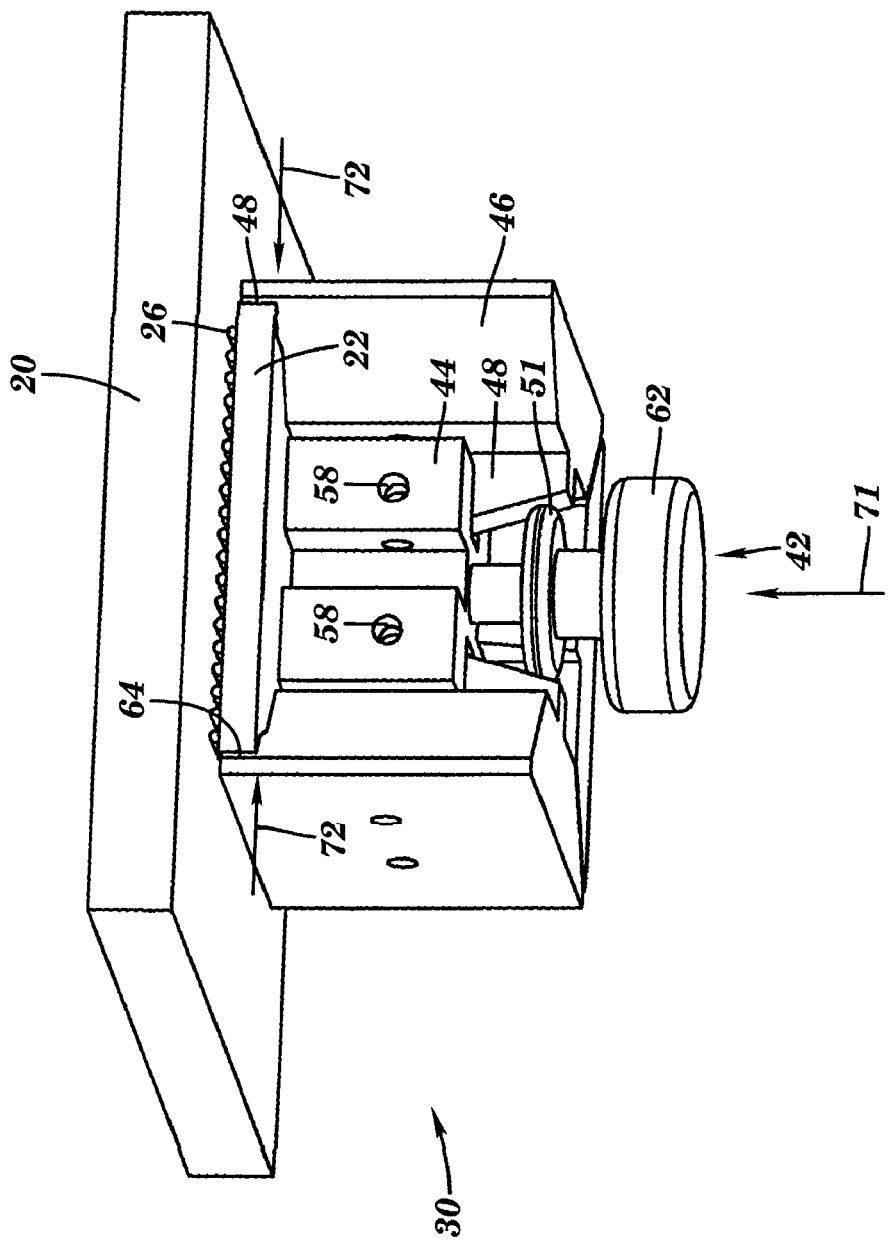
FIG. 2 is a perspective view of the chip and block assembly partially shown in FIG. 1.

FIG. 1 shows a perspective view of a boat assembly 10 in accordance with this invention. The boat assembly 10 includes an upper, framing boat 12 and a lower support boat 14. The boat 12 is formed from boats originally manufactured by Auer to be used for article handling in the semiconductor manufacturing environment. Lower support boat 14 is designed and built by IBM. FIG. 1 illustrates a seat 16 on the top surface of the upper boat 12 with a window 18 in the center of the seat 16. Seat 16 is configured for a substrate 20 to be inserted therein with a chip 22 extending below the window 18 as seen in FIG. 2. FIG. 1 also illustrates a chip block catch nest 24 disposed in boat 14 and aligned with a corresponding seat 16 and window 18 of upper boat 12 (four shown).

After some modifications, boats 12, 14 are assembled to support substrate 20 carrying a chip 22 as shown in FIG. 2. FIG. 2 shows a perspective view of substrate 20 carrying C4 solder joints or C4 array 26 which support semiconductor chip 22 on its lower surface and attached to a block assembly 30 removed from the boat assembly 10 of FIG. 1.

Referring again to FIG. 1, upper, framing boat 12 shows seat 16 on the top surface of upper boat 12 with window 18 in the center of the seat 16. The seat 16 is defined by eight tabs 32 on the outer sides (with two tabs 32 on each side of the seat 16) of the upper boat 42 and four tabs 32' (with two tabs 32 on each end of the seat 16) along the length of the upper boat 12. The tabs 32, 32', which are an integral part of the upper, framing boat 12, are located in positions which provide a snug fit for the substrate 20 when it is inserted onto the seat 16. The window 18 is provided so that a chip 22 can extend below the top surface of the upper boat 12. The bottom of a surface surrounding the seat 16 of the upper boat 12 and the window 18 provide a frame around the lower surface of the substrate 20. The attached chip 22 extends through the window 18 in the center of that frame.

Referring to FIGS. 1 and 2, the substrate 20 is shown operably clamped to block assembly 30 for disposal in seat 16 above the surface of the upper, framing boat 12, and the substrate 20 carries the semiconductor chip 22 secured to the bottom thereof by C4 solder ball joints 26, as is well understood by those skilled in the art. The substrate 20 is located in seat 16 between a pair of end tabs 32 as well as being between the side tabs 32'.

At the stage of the manufacturing and testing process reached when the method and apparatus of the present invention are employed in a KGD process, the chips 22 have been tested in operation while temporarily bonded to the substrate 20 by C4 solder joints 26. The boat assembly 10 includes a mass load or shearing element provided by block assembly 30 operably clamped to chip 22 shown in FIG. 2, which provides a load force that enables shearing the chip 22 with the C4 array 26 attached away from the substrate 20 with a predetermined force. The amount of force applied by block assembly 30 upon chip 22 is adjusted by changing a mass of the block assembly 30 acted upon by gravity when substrate 20 is suspended by upper boat 12. Thus, when the mass of block assembly attached to chip 22 is pulled down by gravity while the substrate 20 is retained in position seated on upper boat 12 by the pair of tabs 32 on the right side of boat 12, as explained in detail below, the block assembly 30 transmits a tensioning or shearing force to the chip 22 and its C4's 26. When a heat source (not shown) is applied to a top surface 34 of substrate 20, the C4's 26 attached thereto become soft enough for the weight of block assembly 30 to shear the chip 22 and the C4's 26 away from the substrate 20, which is held in a fixed position in its seat 16.

The heating process works best in an IR belt type furnace. The top boat 12 and lower boat 14 help to shield the gripper/heat sink assembly 30 from the heat source. The heat will soak through the substrate 20 so that the tips of the C4's 26 that are connected to the substrate 20 conductor pads come to a liquid state first. At this point, the chip 22 with C4 array 26 attached to the gripper/heatsink assembly 30, disconnects from the substrate 20 and begins cooling before the C4's 26 come to a full liquid state.

Note that the configuration or scale of boats 12, 14 is easily changed to accommodate various substrate carrier sizes and block assembly load on chip 22 is easily adjusted to accommodate various chip sizes by adjusting the mass of the block assembly 30, thus offering a great deal of flexibility in application of the apparatus of this invention to use with various product designs.

FIG. 1 is a perspective view of the boat assembly 10 which includes three empty workpiece seats 16 and one seat 16 filled with a substrate 20 along the length thereof, thus being adapted to receive four substrates 20 carrying four respective chips 22.

It should be noted that while the embodiment shown in FIG. 1 includes four workpiece seats 16 for a corresponding four substrates 20, that is simply one example of how one may employ the present invention. However, one seat and one substrate or many more or less than four seats and many more or less than four substrates may be employed in accordance with this invention as a matter of choice and economy of scale.

A perspective view of a single substrate 20, loaded with a single chip 22 (shown in phantom), is shown in FIG. 1. Before a substrate 20 is placed on a seat 16 on the boat assembly 10, the chip 22 has been tested successfully and is ready to be removed from the substrate 20 so that it can be assembled into a commercial product or the like.

FIG. 2 is a perspective view of the block assembly 30 disposed beneath substrate 20, but hidden in FIG. 1, which shows a substrate 20 carrying a semiconductor chip 22 loaded into the seat 16 at the right hand end of the assembly 10 as it is seen in FIG. 1. The chip 22 is ready to be stripped from substrate 20 by the tensioning action of the block assembly 30 suspended over a corresponding chip block catch nest 24 in lower boat 14 when heat is applied to a side of the substrate 20 facing up as in FIG. 1. Heat is applied to a top surface 34 at a predetermined temperature at which the C4 solder joints 26 which provide bonds between the substrate 20 and the chip 22 soften at an interface between substrate 20 and C4 array 26 attachment and release the chip 22 into nest 24 disposed in lower boat 14.

Referring to FIG. 1 again, each nest 24 is aligned with a corresponding window 18 and extends from a bottom surface 36 defining lower boat 14. A perspective view of each of the four nests 24 is shown. Each nest 24 includes a substantially block structure 38 extending toward a corresponding block assembly 30 suspended by upper boat 12. Block structure 38 extends toward block assembly 30 without contacting the same so that block assembly 30 is suspended only to upper boat 12 merely by attachment of the C4 array 26. Further, each block structure 38 includes an aperture 40 configured therein to receive a corresponding drive screw 42 (FIG. 2) extending from block assembly 30 when the C4 array 26 attachment to substrate 20 is separated and block assembly 30 falls toward lower boat 14. In this manner, aperture 40 receives drive screw 42 such that block assembly 30 does not fall awkwardly or uncontrollably causing damage to chip 22 clamped to block assembly 30. The purpose of each nest can be easily realized by referring to FIG. 1, where each nest controllably receives a corresponding block assembly 30 with screw 42 extending therefrom to avoid collision with other block assemblies causing damage to chips 22 clamped thereto.

Referring again to FIG. 1, the largest elements of the boat assembly 10 comprise a pair of stainless steel sheet metal boats including upper, framing boat 12 (known as an Auer boat manufactured and sold by Auer Precision Co., Inc. which is located in Mesa, Ariz.) and lower support boat 14 designed by IBM which are assembled together by snap-fit or interference connection of the upper boat 12 over a cavity 46 defined by lower boat 14. Boat 12 and boat 14, if they are Auer type boats, are employed as industry standard process carriers that are typically used in manufacturing of electronic substrate devices.

FIG. 2. shows block assembly 30 after the drive screw 42 has been driven far enough toward a yoke bloke 44 of the block assembly 30 so that edges defining chip 22 are clamped thereby. More specifically, block assembly 30 includes yoke block 44 threadably engaged with screw 42 to operably pivot jaws 46 to clamp edges 48 defining chip 22 thereto. Note that although four jaws 46 are employed in an exemplary embodiment, only three jaws are shown in FIG. 2 for sake of clarity. Furthermore, use of more or less than four jaws is equally contemplated.

Figure 3:
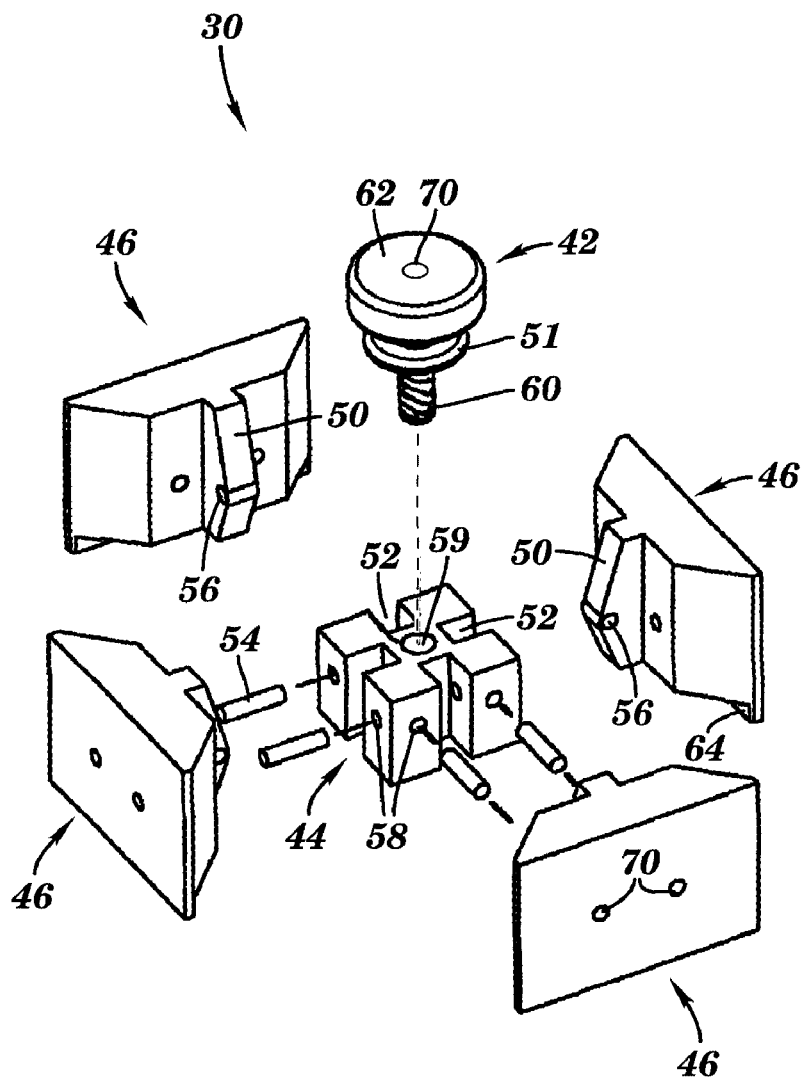
FIG. 3 is an exploded perspective view of the block assembly of FIG. 2 shown upside down.

Referring now to FIGS. 2 and 3, each jaw 46 preferably includes an inclined cam surface 50 configured for operable engagement with a cam drive 51 extending from screw 42. In an exemplary embodiment as shown, yoke bloke 44 is configured substantially as a cube, but not limited thereto, having two opposite sides substantially normal to four contiguous sides defining the cube. Each of the four contiguous sides being configured with a groove 52 extending a length of each side defining a height of each of the sides to pivotally receive a cam surface 50 of a corresponding jaw 46 therein. Each jaw 46 is pivotally received in a corresponding groove 52 via a pin 54 extending through an opening 56 in the cam surface 50 and received in apertures 58 disposed in yoke block 44 on either side of a respective groove 52. Therefore, four pins 54 are employed for pivotally mounting four jaws 46 to block 44. One of the two opposite sides of yoke block 44 substantially normal to the four contiguous sides includes a threaded aperture 59 to operably engage corresponding threads 60 on screw 42. An end opposite threads 60 of screw 42 includes a knob 62 configured for manual manipulation of screw 42. Cam drive 51 is disposed intermediate threads 60 and knob 62. Cam drive 51 is configured as a disc fixedly secured by a center defining the disc with an axis defining screw 42. However, cam drive 51 may include other suitable configurations and is not necessarily fixed with respect to screw 42 as will be appreciated by one skilled in the pertinent art.

Each jaw 46 (four shown in FIG. 3) is configured with a clamp surface 64 distal from knob 62. Each clamp surface 64 is configured to engage edge 48 defining chip 22, such that when screw 42 is turned translating cam 51 in a direction 71, clamp surfaces 64 are translated in a direction 72 toward an axis defining screw 42 for clamping chip 22 with block assembly 30. It should be noted that the two holes in each jaw 46 are used for assembly purposes, however, they can also be used to attach additional weight discussed more fully below.

In an exemplary embodiment, yoke block 44 and jaws 46 are configured to operate as a heatsink when chip 22 is operably coupled thereto. It will be recognized by one skilled in the pertinent art that the only critical requirement in material selection is that the screw 42, cam drive 51, and jaws 46 have substantially the same coefficient of expansion and is suitable for the heat involved. In a preferred embodiment, stainless steel or titanium for gripper assembly 30 may be employed, but not limited thereto. Further, a thin piece of Vespal (a soft thermal plastic) is optionally bonded to surface 64 to reduce the risk of damage to the chip 22 when clamping. Another method to reduce chip damage is to shape surface 64 so that it touches only the sides defining the chip and not the corners thereof. This may be done by adding a corner relief where the jaw would not touch the corner of the chip. When all of four of the shearing elements or block assemblies 30 are in contact with the edges of four chips 22 on the fixture 10, then the fixture 10 and its load of substrates 20 is ready to have a controlled heat source applied to each surface 34 of a corresponding substrate 20 to raise the temperature to a high enough temperature to soften the C4 solder balls and at such temperatures, the shear force being exerted by block assembly 30 is sufficient to release the C4 solder balls 26 and the chip 22 from the substrate 20 causing the chip 22 to fall down from the bottom of the substrate 20. More specifically, a temperature gradient is established between the substrate, solder connections, and chip, such that the temperature gradient causes the solder connections to the substrate to become liquidus before the solder connections to the chip. Applying the heat source to surface 34 of the substrate 20 distal from the semiconductor device 22 causes separation of the substrate 22 with the solder connections 26 before separation of the semiconductor device 22 with the solder connections 26 while the solder is in a solid state.

The amount of force being applied to the chip 22 by the gravitational force on block assembly 30 is a very important aspect of this invention. Too much force can cause damage to the bottom layer metallurgy (BLM) of the chip 22 and too little force will not shear the C4's of chip 22 thereby failing to remove it from the substrate 20. Therefore, a tight process window, in terms of grams of force per C4 solder connection, is required. To monitor this, a load cell (not shown) may be connected to an electronic force measuring system that measures the force during each product load cycle. To adjust the ultimate shear force on the C4's bonded to the chip 22, the tension adjustment, e.g., weight of block assembly 30 may be adjusted by either adding or subtracted mass therefrom. For example, mass may be added to knob 62 and/or one or more jaws using apertures 70 thereof (seen in FIG. 3). Changing the mass of block assembly 30 changes the tension acting on substrate 20 by applying more or less tension to substrate 20.

The present device and method of the invention are effective for chip removal from a substrate; and they provide a pre-load mechanism for removing known good dies from substrate carriers.

The basic concept includes providing a controlled heat source at the bottom of the substrate. The heat is conducted through the substrate to the C4's, then to the chip. A heatsink is attached to the chip thus allowing a means to apply a separation force to the die. A temperature gradient between the heated substrate, C4's and the chip is then established. The heat sink will provide a cooling effect for the chip, thus resulting in a lower temperature within the chip and C4 as compared to the substrate. The side of the C4 closer to the substrate will also be warmer than the side contacting the chip. This temperature gradient causes the C4 solder on the substrate to approach liquidus earlier than the chip side. Therefore, separation will occur on the substrate side first. Once separated, the chip with C4 array is detached and away from the substrate, thus allowing it to begin cooling. This prevents the C4 connection on the side of the chip from reaching a liquid temperature.

In addition costs are minimized by low tooling cost due to minimal machining during fabrication and by the flexibility of the apparatus and the process which permits adapting the tool to operate with product variations is achieved with minimal cost.

In addition this invention provides process consistency with uniform shear/tension forces applied to each chip at room temperature.

The invention disclosed here greatly increases yield by reducing the risk of various damages to the C4 or BLM by offering a method and apparatus that allows each C4 to partially become liquidus only at the point of contact with the substrate C4 pad. This ensures that the BLM remains rigid during the shearing process and minimizes the force required to separate the die from the substrate with minimum damage to the C4, thus promoting intact C4's.

All methods currently used are done with C4's at a uniform temperature, therefore, the force required to shear each C4 away from a respective substrate pad is transferred via the C4 to the BLM structure that attaches the C4 to the die. With this disclosed invention, the area of the C4 contacting the respective pad on the substrate will become liquidus first, thereby greatly reducing shear forces transferred to the BLM.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for removing a circuit chip from a substrate wherein the chip is secured to a substrate by solder connections, comprising:
   a shearing element configured to apply a loading force to the chip; and
   a fixture having a loading element for placing the substrate with the chip onto the fixture, wherein the solder connections intermediate the chip and the substrate are heated to a predetermined temperature by applying a heat source to a surface of the substrate distal from the chip,
   wherein the shearing element is releasably clamped to the chip using a drive screw to operate a plurality of claws that clamp edges defining the chip.

2. The apparatus of claim 1 wherein:
   the substrate is suspended in a seat of the loading element with the chip extending through a window therein; and
   a loading force is provided by the shearing element biasing the chip away from the substrate.

3. The apparatus of claim of claim 1, wherein said shearing element provides a gravitational force on the chip and is a heatsink in thermal communication with the chip.

4. The apparatus of claim 1, wherein a temperature gradient is established between the substrate, solder connections, and chip, said temperature gradient causing the solder connections to the substrate to become liquidus before the solder connections to the chip.

5. The apparatus of claim 1, wherein said heat source is a controlled heat source applied to said surface of the substrate.

6. The apparatus of claim 1, wherein the predetermined temperature is below the melting temperature of the solder at which shearing of the solder connections occurs.

7. The apparatus of claim 1, wherein the fixture includes a nest located below the window adapted and located for catching the chip sheared from the substrate.

8. An apparatus for separating a semiconductor device from a substrate wherein the semiconductor device is attached to the substrate by solder connections to form an assembly, comprising:
   a shearing element for applying a loading force to separate the device from the substrate to which into a loading position under a fixture it is urged;
   a loading element for placing the assembly of the substrate and the semiconductor device into said fixture with a window therethrough for the semiconductor device with the shearing element in thermal contact with the semiconductor device and armed for shearing the semiconductor device from the substrate, wherein the shearing element is releasably clamped to the semiconductor device using a drive screw to operate a plurality of claws that clamp edges defining the chip.

9. The apparatus of claim 8, wherein the shearing element comprises a heatsink configured to provide said loading force and a temperature gradient between the device and the substrate when heat is applied to the substrate.

10. The apparatus of claim 8, wherein the shearing element is weighted heatsink affixed to the device and applies said loading force based on a weight of the shearing element.

11. The apparatus of claim 8, wherein the shearing element comprises:

a yoke block threadably engaged with said drive screw through one of two opposing sides normal to said contiguous sides defining said yoke block;

a plurality of jaws each pivotally coupled to a corresponding side of contiguous sides defining said yoke block; and wherein, each of said plurality of jaws is configured to clamp edges defining the semiconductor device to said yoke block when said drive screw is manipulated.

12. The apparatus of claim 11, wherein said plurality of jaws each includes an inclined cam surface engaged with a drive cam axially disposed on said drive screw, said drive cam configured to operably pivot each of said plurality of jaws when said drive screw is turned translating said drive cam along an axis defining said drive screw.

* * * * *